United States Patent [19]

Ichitani et al.

[11] Patent Number: 4,802,405
[45] Date of Patent: Feb. 7, 1989

[54] AUTOMOTIVE AIR-CONDITIONER

[75] Inventors: Yutaka Ichitani, Kariya; Masayoshi Imaeda, Nagoya; Yoshimasa Ikeda, Toyota; Yoji Nishimura, Okazaki; Kiyokazu Seikou, Toyota, all of Japan

[73] Assignees: Nippondenso Co., Ltd., Kariya; Toyota Jidosha Kabushiki Kaisha, Toyota, both of Japan

[21] Appl. No.: 145,690

[22] Filed: Jan. 15, 1988

Related U.S. Application Data

[63] Continuation of Ser. No. 935,682, Nov. 26, 1986, abandoned.

[30] Foreign Application Priority Data

Nov. 28, 1985 [JP] Japan .................. 60-183274[U]

[51] Int. Cl.4 .................................... B60H 1/26
[52] U.S. Cl. ..................... 98/2.06; 165/41; 165/42; 165/43; 165/100; 165/122
[58] Field of Search ............ 98/2.01, 2.05, 2.06, 98/2.07, 2.08, 2.11; 165/40, 41, 42, 43, 96, 100, 122, 124; 415/94, 98, 102, 103, 184, 199, 200 R

[56] References Cited

U.S. PATENT DOCUMENTS

| | | | |
|---|---|---|---|
| 2,655,349 | 10/1953 | Beavin | 98/2.11 |
| 2,727,680 | 12/1955 | Madison et al. | 415/98 |
| 3,246,605 | 4/1966 | Fisher | 416/200 |
| 4,289,195 | 9/1981 | Bellot et al. | 165/12 |

FOREIGN PATENT DOCUMENTS

| | | | |
|---|---|---|---|
| 146414 | 11/1981 | Japan | 98/2.05 |
| 58-192705 | 12/1983 | Japan | |
| 1445234 | 8/1976 | United Kingdom | 98/2.06 |

*Primary Examiner*—Harold Joyce
*Attorney, Agent, or Firm*—Cushman, Darby & Cushman

[57] ABSTRACT

An automotive air-conditioner has a motor-driven centrifugal fan and a casing accommodating the fan and having first and second wall portions adjacent to axially opposite open ends of the fan, respectively. A fresh-air inlet and a first recirculated-air inlet are formed in the first wall portion, while a second recirculated-air inlet is formed in the second wall portion to increase flow of recirculated-air sucked into the fan during a recirculation mode of air-conditioner operation. The fresh-air inlet and the first recirculated-air inlet are selectively opened and closed by a servo-actuated damper, while the second recirculated-air inlet is closed and opened by another servo-actuated damper operatively linked to the first-mentioned damper.

8 Claims, 7 Drawing Sheets

AUTOMOTIVE AIR-CONDITIONER

This is a continuation of application Ser. No. 935,682, filed Nov. 26, 1986, which was abandoned upon the filing hereof.

BACKGROUND OF THE INVENTION

The present invention relates to an automotive air-conditioner.

The prior art automotive air-conditioner of the type that is installed under the instrument panel of a passenger car is generally of the structure which is schematically illustrated in FIG. 1 of the accompanying drawings. More specifically, the prior art air-conditioner comprises a housing formed by a duct 20 having an upstream end connected to a discharge port of a fan casing 100 which accommodates a centrifugal fan 104 having a large number of vanes. The fan casing 100 is provided with a fresh air inlet 101 and a recirculated-air inlet 102 both located adjacent to the end of the fan 104 remote from a fan motor 105 drivingly connected to the fan. The air inlets 101 and 102 can be selectively opened and closed by means of a change-over damper 103 so that either fresh air or recirculated air can be sucked by the fan 104 into the duct 20.

An air-cooling heat exchanger formed by a refrigerant evaporator 21 and an air-heating heat exchanger formed by a heater core 22 are disposed in the duct 20 with the heater core 22 positioned downstream of the evaporator 21. The air from the fan 104 all flows through the evaporator 21. However, the heater core 22 is so disposed in the duct 20 that a bypass passage 24 is defined between the heater core 22 and the inner wall of the duct 20. An air-mixing damper 23 is provided in the duct 20 to adjust the ratio of distribution of air from the evaporator 21 to the heater core 22 and the bypass passage 24. When the air-conditioner is operated in cooling mode, the air passing through the evaporator is cooled thereby and flows through the heater core 22 and/or the bypass passage 24 at a distribution ratio determined by the air-mixing damper 23. The air flowing through the heater core 22 is heated by hot engine-cooling water flowing therethrough in heat exchange relationship with the air, whereas the air flowing through the bypass passage 24 is not heated but is at a low temperature. The heated air and the cooled air are mixed together in an air-mixing chamber 25 provided in the duct 20 downstream of the heater core 22. The air-conditioner is so controlled that the mixture of the heated and cooled airs is at a desired temperature level.

The downstream end of the duct 20 is divided into three outlets; namely, a ventilation air outlet 26, a heated air outlet 27 and a defrosting air outlet 28. A ventilation-defrosting change-over damper 31 and a heated-air damper 33 are disposed adjacent to the outlets 26–28 and are operatively linked to mode selection levers (not shown) on a control panel (not shown) so that the dampers 31 and 33 are pivotally moved to selectively open and close the outlets 26–28.

The automotive air-conditioner of the class discussed above is required to be as compact as possible so that the air-conditioner can be installed in a very limited space. At the same time, the air-conditioner must satisfy the requirements in respect of the air-blowing capacity and low level of noise produced during air-conditioning operation.

SUMMARY OF THE INVENTION

The present invention has its object to provide an automotive air-conditioner which satisfies the requirements pointed out above.

The automotive air-conditioner according to the present invention has a fan section and an air-conditioning section connected to a discharge side of the fan section to receive air therefrom and condition the thus received air. The air-conditioning section has at least one outlet through which the thus conditioned air flows into an occupant compartment. The fan section comprises a centrifugal fan having a plurality of circumferentially arranged vanes and axially opposite open ends through which flows of air enter the fan. A fan casing accommodates the centrifugal fan and has a first wall portion adjacent to one of the open ends of the fan and a second wall portion adjacent to the other open end of the fan. The first wall portion is formed therein with a fresh-air inlet and a first recirculated-air inlet both adapted to be communicated with the one open end of the fan. The second wall portion is formed therein with a second recirculated-air inlet adapted to be communicated with the other open end of the fan. The fresh-air inlet and the first recirculated-air inlet are selectively opened and closed by a first valve means. The second recirculated-air inlet is opened and closed by a second valve means. The first and second valve means are operatively associated with actuating means.

The provision of the second recirculated-air inlet in addition to the first recirculated-air inlet advantageously greatly increases the flow of recirculated air sucked into the fan section and thus into the air-conditioning section.

The above and other objects, features and advantages of the present invention will be made more apparent by the following description with reference to the accompanying drawings.

DESCRIPTION OF PREFERRED A EMBODIMENT

Figure 3:
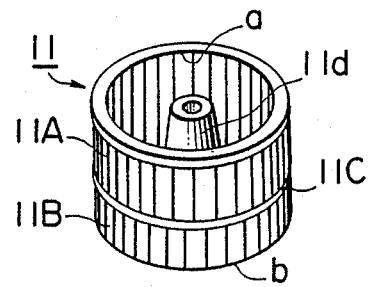
FIG. 3 is a perspective view of a centrifugal fan incorporated in the air-conditioner shown in FIG. 2.
Figure 2:
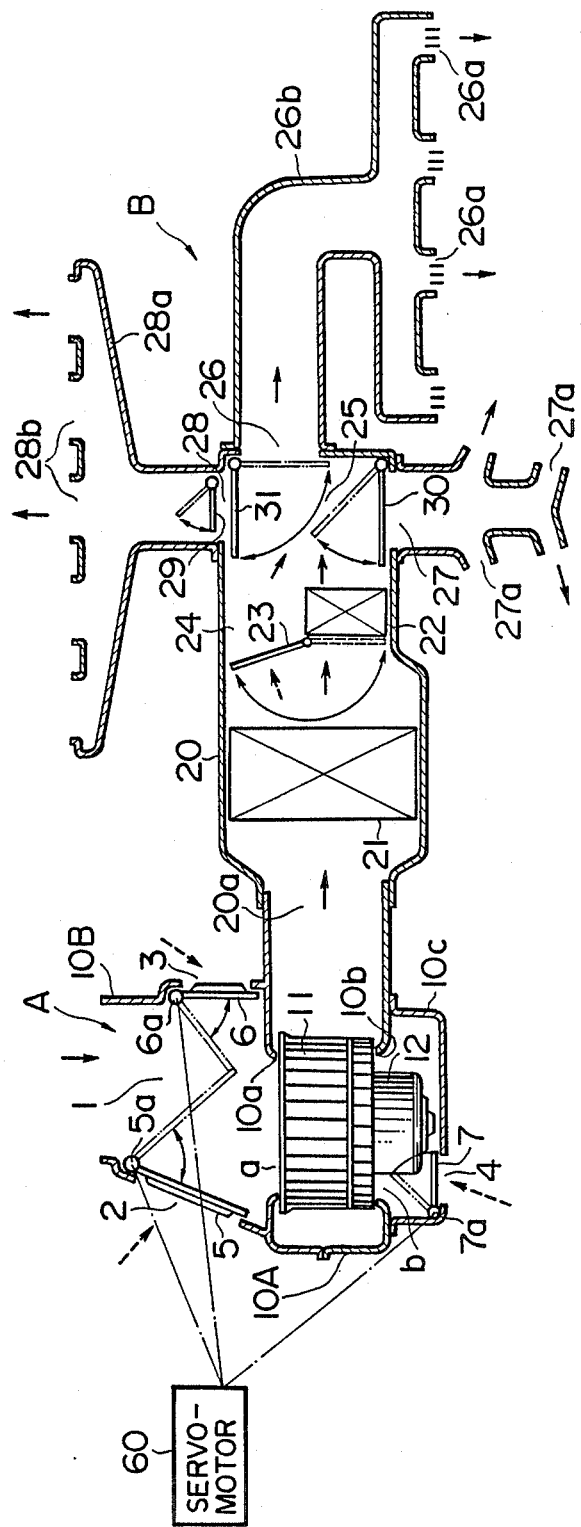
FIG. 2 is similar to FIG. 1 but illustrates an embodiment of an automotive air-conditioner according to the present invention.

Referring to FIGS. 2 and 3 of the drawings, an automotive air-conditioner comprises a fan section generally designated by A and an air-conditioning section generally designated by B and including a duct 20 open at an upstream end to form an air inlet 20a. The fan section A includes a scroll fan casing 10A which accommodates a centrifugal fan 11 having a large number of vanes.

The fan casing 10A has top and bottom walls in which first and second suction ports 10a and 10b are formed and are so disposed as to be in alignment with upper and lower open ends a and b of the fan 11, respectively. The first suction port 10a is covered by an upper air induction casing 10B connected to the top wall of the fan casing 10A. The upper air induction casing 10B has a top wall formed therein with a large fresh-air inlet 1 and side walls formed therein with a first re-circulated-air inlet which is divided into two openings 2 and 3. First and second dampers 5 and 6 are pivotally mounted on the upper air induction casing 10B and arranged such that the first damper 5 is pivotally moved to selectively open and close the recirculated-air inlet opening 2 and a part of the fresh air inlet 1 while the second damper 6 is pivotally moved to selectively open and close the recirculated-air inlet opening 3 and the rest of the fresh-air inlet 1.

The fan 11 is driven by an electric motor 12 mounted on the fan casing 10A in a manner to be described in detail later and projecting from the lower end of the fan 11 into and through the second suction port 10b formed in the bottom wall of the fan casing 10A. An annular clearance or passage is defined between the motor 12 and the inner periphery of the second suction port 10b. A lower air induction casing 10C is connected to the bottom wall of the fan casing 10A and so disposed as to enclose the fan motor 12 and the second suction port 10b. The lower air induction casing 10C is formed therein with a second recirculated-air inlet 4 which is adapted to be opened and closed by a third damper 7 pivotally mounted on the lower air induction casing 10C.

The first, second and third dampers 5, 6 and 7 are drivingly connected to a servomotor 60 by a link mechanism shown in FIG. 2 by one-dot lines and to be described in detail later. The dampers 5–7 are operated by the servomotor 60 and the link mechanism such that, when the air-conditioner is in recirculated-air induction mode, the dampers 5–7 are in their positions shown by broken lines to fully close the fresh-air inlet 1 and fully open the recirculated-air inlets 2–4 and such that, when the air-conditioner is in fresh-air induction mode, the dampers are pivotally moved to their positions shown by solid lines to fully close the recirculated-air inlets 2–4 and fully open the fresh-air inlet 1.

Figure 8:
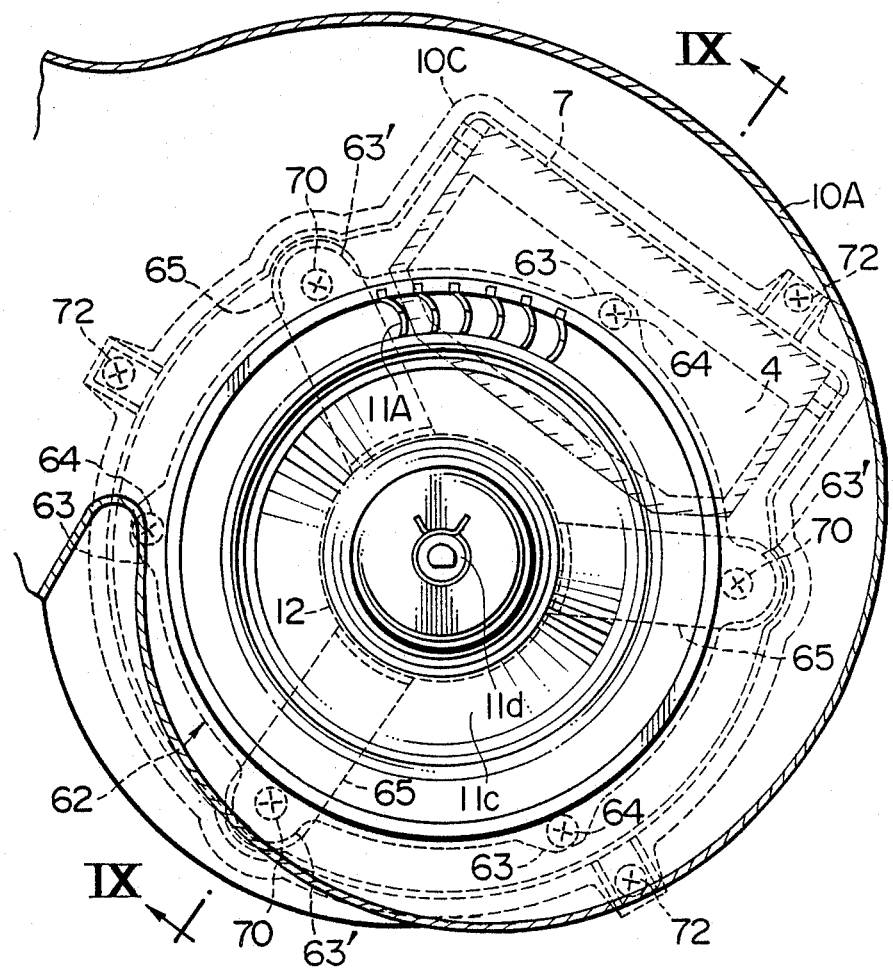
FIG. 8 is an enlarged cross-section of the fan casing showing in plan view the centrifugal fan mounted in the fan casing.
Figure 9:
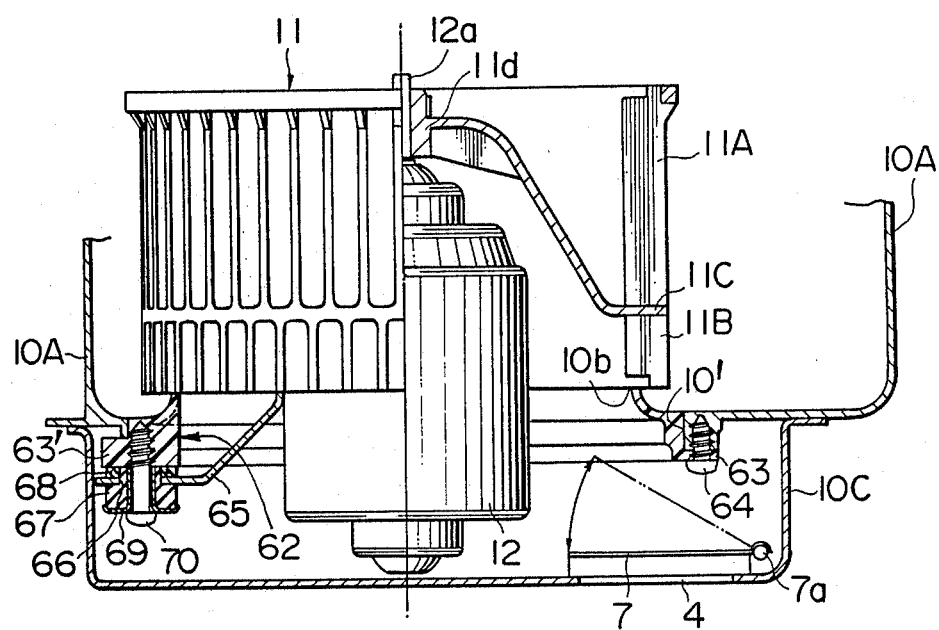
FIG. 9 is an axial section taken along line IX—IX in FIG. 8.

The fan 11 is generally cylindrical, as will be seen in FIGS. 3, 8 and 9 and divided into two fan parts 11A and 11B by a frusto-conical partition 11c which is operative to assure that flows of air entering the centrifugal fan 11 through the open ends a and b thereof are prevented from being mixed in the fan 11. The fan part 11A has fan blades or vanes which are circumferentially offset from those of the other fan part 11B. The frusto-conical partition 10C of the fan 11 terminates in an integral central hub 11d which is secured to an output shaft 12a of the motor 12 to drivingly connect the fan blades to the motor shaft.

The air-conditioning section B has a structure which is essentially the same as in the prior art. Thus, the parts the same in function as those of the prior art are designated by the same reference numerals to eliminate mere repetition of similar description. A damper 30 is pivotally mounted in the duct 2 adjacent to a heated air outlet 27 to selectively open and close the same. Another damper 31 is pivotally mounted in the duct 20 adjacent to a ventilation air outlet 26 and a defrosting air outlet 28 to selectively change over the communication of these outlets 26 and 28 with an air-mixing chamber 25. A further damper 29 is pivotally mounted in the defrosting air outlet 28 to adjust the flow of defrosting air therethrough. The ventilation air outlet 26 is connected to a ventilation air duct 26b which terminates in ventilation air slits 26a through which ventilation air flows into a passenger compartment of a passenger car on which the airconditioner is mounted. The heated air outlet 27 leads to a plurality of heated air outlet openings 27a to the passenger compartment. The defrosting air outlet 28 is connected to a defrosting air nozzle 28a having a plurality of nozzle ports 28b.

Figure 4:
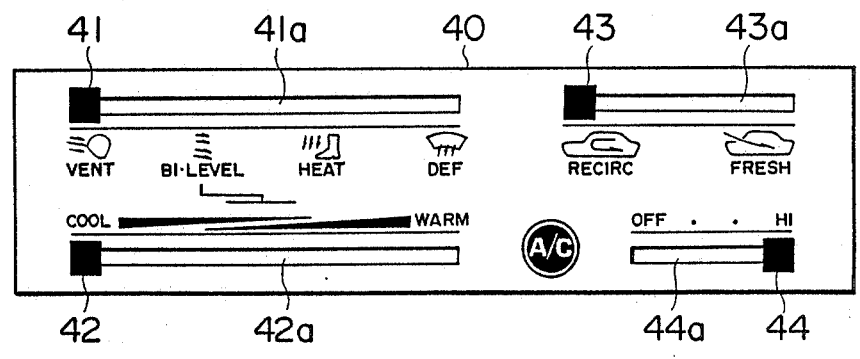
FIG. 4 is a plan view of a control panel.

Referring to FIG. 4, a control panel for the air-conditioner described above includes a base plate 40 which may be a part of an instrument panel of the passenger car and which is formed therein with a plurality of lever guide channels 41a–44a. A plurality of levers 41–44 are movable along the lever guide channels 41a–44a, 44a, respectively. The lever 41 is used to changeover the air-conditioning modes which are indicated by "VENT" (ventilation), "BI-LEVEL", "HEAT" and "DEF" (defrosting). The lever 42 is operatively connected to the air-mixing damper 23 to adjust the temperature of air to be discharged into the passenger compartment. The lever 43 is operatively associated with the servo-motor 60, the arrangement being such that, when the lever 43 is in a position indicated by "FRESH", the fresh-air inlet 1 is fully opened and the first and second recirculated-air inlets 2–4 are fully closed and such that, when the lever 43 is moved to a position indicated by "RECIRC" (recirculation), the fresh-air inlet 1 is fully closed and the first and second recirculated-air inlets 2–4 are fully opened. The fourth lever 44 is used to adjust the electrical power supply to the fan motor 12 to control the air-blowing capacity thereof.

Figure 5:
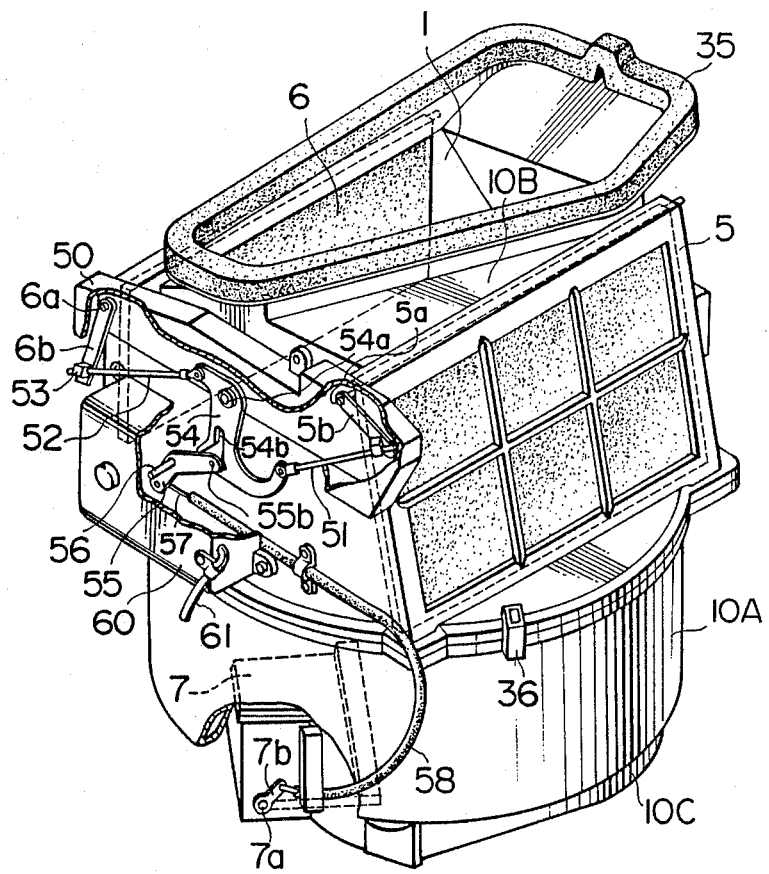
FIG. 5 is a perspective view of a fan casing with a part thereof cut away to show a link mechanism for operating dampers.
Figure 6:
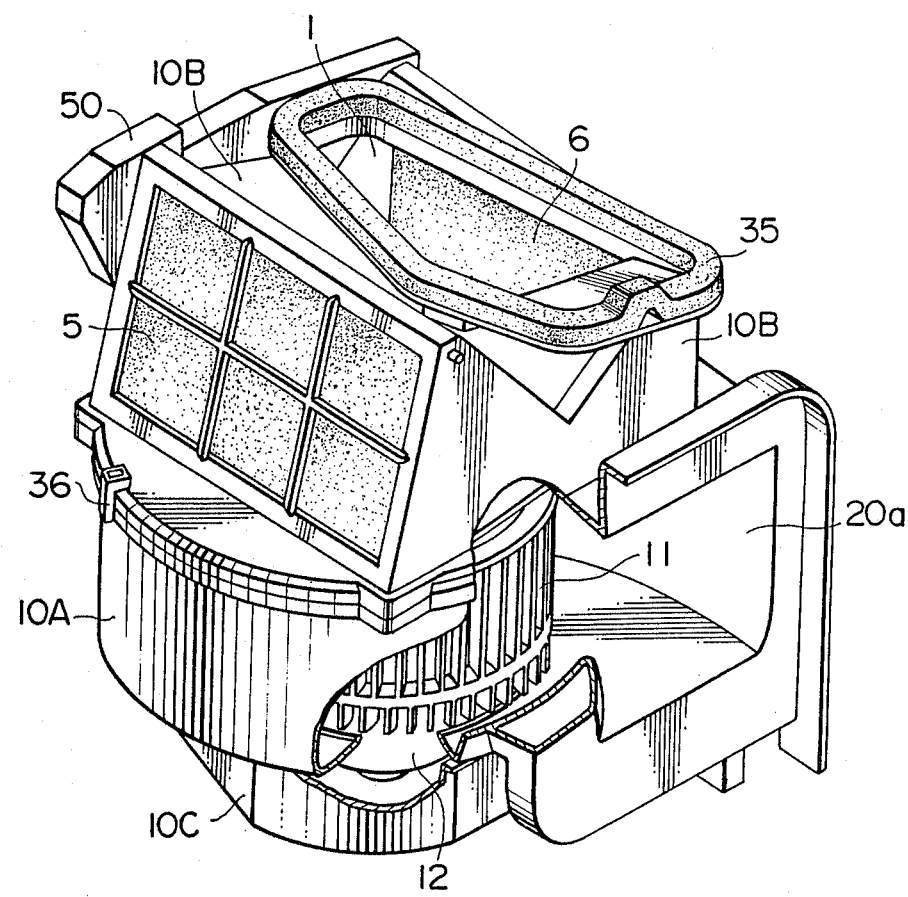
FIG. 6 is another perspective view of the fan casing with a part thereof cut away to show the centrifugal fan mounted therein.
Figure 7:
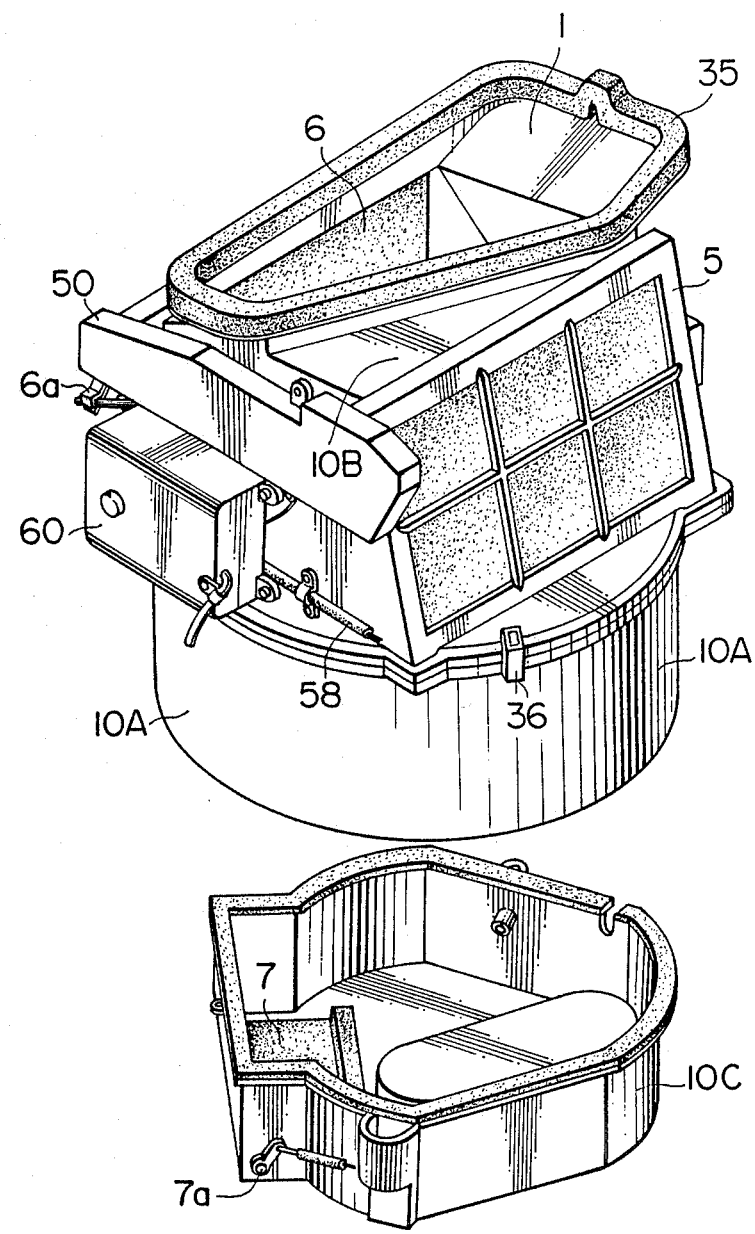
FIG. 7 illustrates in perspective view the outer appearance of the fan casing with a lower part thereof shown disassembled from an upper part thereof.

Referring now to FIGS. 5–7, the link mechanism which drivingly connects the servomotor 60 to the dampers 5, 6 and 7 is partly housed in an elongated cover 50 mounted on a side wall of the upper air induction casing 10B. The servomotor 60 is a conventional electrically energized motor having an output shaft 56. The structural details of the electrical servomotor 60 are well known in the art and thus are neither shown nor described herein. It will be sufficient to describe that the servomotor 60 is electrically connected to an electric conductor 61.

The link mechanism includes levers 5b and 6b both secured at their one ends to axles 5a and 6a which are connected respectively to the dampers 5 and 6 for rotation therewith. The other ends of the levers 5b and 6b are pivotally connected, respectively, to one ends of rods 51 and 52 by means of pivot joints 53. A generally Z-shaped first rotary member 54 is rotatably mounted by a shaft or pin 54a on the side wall of the upper air induction casing 10B and has a pair of arms pivotally connected to the other ends of the rods 51 and 52, respectively. The output shaft 56 of the servomotor 60 is secured to a second rotary member 55 having two arms one of which carries a pin 55b which in turn is loosely received in a slot or hole 54b of an irregular shape formed in the first rotary member 54 to form a lost motion connection between the first and second rotary members 54 and 55 so that the rotation of the second rotary member 55 caused by the servomotor 60 can be transmitted from the second rotary member 55 to the first rotary member 54 to rotate the same.

The link mechanism further includes a third lever 7b fixed at one end to a shaft 7a to which the damper 7 is fixed for rotation therewith. The other end of the lever 7b is connected to the other arm of the second rotary member 55 through a wire 57 slidably extending through a wire sheath 58.

The conductor 61 of the servomotor 60 is electrically connected to a micro switch (not shown) which is switched on and off by the fresh-recirculation air change-over lever 43 on the control panel 40. Thus, the servomotor 60 is responsive to leftward and rightward movements of the lever 43 to rotate predetermined angles in normal and reversed directions, respectively. The rotation of the servomotor 60 rotates the second rotary member 55 counterclockwise or clockwise. Thus, the wire 57 connected to one of the arms of the second rotary member 55 is moved in forward or backward direction to open or close the damper 7. At the same time, the pin 55b on the other arm of the second rotary member 55 transmits the rotation thereof to the first rotary member 54 to rotate the same about the axis of the shaft 54a. The rotation of the first rotary member 54 pulls or pushes the rods 51 and 52 to rotate the levers 5b and 6b whereby the dampers 5 and 6 are opened or closed in predetermined pattern already described hereinbefore.

Referring further to FIGS. 5-7, a packing 35 is provided along the peripheral edge of the opening of the fresh-air inlet 1 in the upper air induction casing 10B. The fan casing 10A is formed by upper and lower fan casing parts sealingly connected together by a plurality of clamps only one of which is shown at 36 in each of FIGS. 5-7. The lower air-induction casing 10C is also sealingly connected to the bottom wall of the lower part of the fan casing 10A. For this purpose, a packing similar to the packing 35 may be provided along the peripheral edge of the upper opening of the lower air-induction casing 10-C.

FIGS. 8 and 9 show the structural details of the centrifugal fan 11 and the support for the fan 11 from the fan casing 10A. Practically, the second suction port 10b, which has been described as being formed in the bottom wall of the fan casing 10A, is defined by an inner peripheral edge of an annular air guiding ring 62 of a molded plastic material fitted into a circular opening 10' formed in the bottom wall of the fan casing 10A. The ring 62 has a first set of a plurality of circumferentially spaced and radially outwardly extending tabs 63 secured to the bottom wall of the fan casing 10A by self-tapping screws 64 extending through the tabs 63 into the fan casing bottom wall. The ring 62 also has a second set of similar tabs 63' each disposed between a pair of circumferentially adjacent tabs 63. Three radial stays 65 are arranged around the motor 12 in circumferentially equally spaced relationship and have their radially inner ends secured to the outer peripheral surface of the body of the motor 12 by spot welding. Each of the stays 65 has a radially outer end formed therein with a grommet hole 66 through which a shank portion of a first T-shaped grommet 67 of rubber extends with a head portion of the grommet 67 engaged with the outer or bottom surface of the stay 65 around the grommet hole 66. A second grommet or ring 68 of rubber is disposed between the inner or upper surface of the stay 65 around the grommet hole 66 and the outer or bottom surface of one of the tabs 63' of the plastic ring 62 and extends around the stem portion of the first grommet 67. A T-shaped metallic collar 69 has its stem portion inserted into the through-hole in the first grommet 67. A self-tapping screw 70 has its stem portion extending through a through-hole in the collar 69 and screwed into the plastic ring 62 to cause the head of the screw 70 to urge the stem portion of the collar 69 into engagement with the outer surface of the plastic ring 62 against the resiliencies of the superposed grommets 67 and 68 whereby the outer end of each of the stays 65 is resiliently connected to the plastic ring 62. This arrangement is effective to absorb vibration of the fan motor 1 which would otherwise be transmitted to the fan casing 10A. It will also be noted that, because the opening 10' has a diameter greater than that of the fan 11 and the stays 65 of the fan motor 12 are supported from the plastic ring 62 which in turn is removably mounted on the fan casing 10A, the fan 11, the motor 12, the plastic ring 62 and the stays 65 can be detached as a unit from the fan casing 10A simply by detaching the lower air induction casing 10C from the fan casing 12 and removing the screws 63. For this purpose, the lower air induction casing 10C is removably mounted on the bottom wall of the fan casing 10A by three circumferentially spaced self-tapping screws 72, as will be seen in FIG. 8.

Then, the operation of the described embodiment of the invention will be described hereunder.

RECIRCULATION MODE

Figure 1:
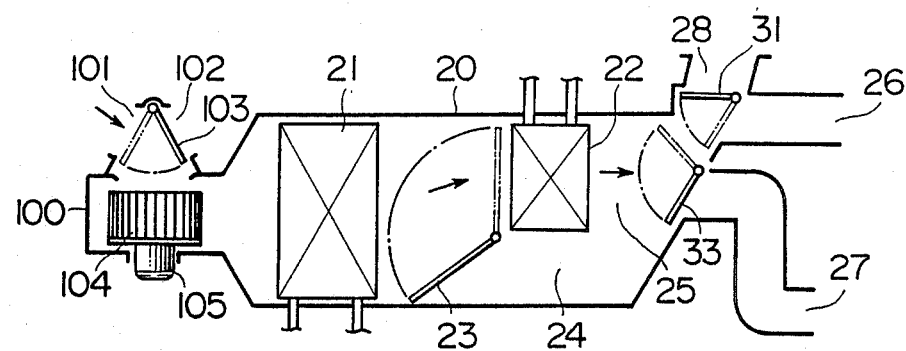
FIG. 1 is a schematic illustration of the prior art automotive air-conditioner discussed above.

The lever 43 on the control panel 40 is moved to "RECIRC" position so that the servomotor 60 is operated to actuate the link mechanism to cause the dampers 5-7 to be moved to the broken line positions shown in FIG. 1 to fully close the fresh-air inlet 1 and fully open the recirculated-air inlets 2-4. It will be noted that, because the second recirculated-air inlet 4 is provided in the air-conditioner in addition to the first recirculated-air inlets 2 and 3, the total sectional area of the recirculated-air inlets is greatly increased compared with that in the prior art air-conditioner with a resultant remarkable decrease in the resistance of the fan section A to the flow of air thereinto. Thus, even if the centrifugal fan 11 itself is of the same size as the centrifugal fan incorporated in the prior art air-conditioner, the fan 11 is capable of blowing air at a greatly increased flow rate.

This is particularly advantageous in that, in the conventional air-conditioner, a high level of operation noise was produced due partly to the fact that a localized pressure difference is produced in a centrifugal fan to cause a turbulence therein and partly due to the fact that resonance of the vanes of the fan and the casing thereof took place. Such noise is undesirable especially in an automotive air-conditioner having its air blower designed to be disposed close to a passenger's seat in a passenger compartment of a passenger car. On the contrary, the level of the noise produced in the fan section A is greatly reduced in the described embodiment of the invention because the resistance of the fan section A to the entrance of air into the centrifugal fan 11 is greatly decreased for the reason described above.

The vanes of the upper fan part 11A are preferably circumferentially offset from the vanes of the lower fan part 11B, as described previously. This is advantageous in that the phase of the wave of condensation and rarefaction of air discharged from one of the fan parts 11A is shifted from the phase of the wave of condensation and rarefaction of air discharged from the other fan part 11B so that the two waves of the different or shifted phases interfare with each other to advantageously lower the level of noise produced by the blast of air through the air-conditioner. In addition, the division of the first reirculated-air inlet into two openings 2 and 3 disposed at separate points on the fan casing advantageously makes it possible to employ a compact design of the outer appearance of the fan casing.

FRESH AIR INDUCTION MODE

The lever 43 will be moved to the "FRESH" position on the control panel 40 so that the dampers 5 and 6 are moved to the solid line positions in FIG. 1 to fully close the recirculated-air inlets 2 and 3 and fully open the fresh-air inlet 1. At the same time, the damper 7 is moved to the solid line position to fully close the second recirculated-air inlet 4. In this case, the upper fan part 11A is operative to suck fresh air through the fresh-air inlet 1 and blows the thus sucked fresh air into the air-conditioning section B.

In this mode of operation, the lower fan part 11B is not operative to suck fresh air into the air-conditioner. Extensive tests and researches were conducted to ascertain the ratio of the air-blowing capacities of the upper and lower fun parts 11A and 11B of the centrifugal fan 11 to avoid any undue decrease in the rate of air flow during fresh air induction mode of the air-conditioner operation due to the inoperativeness of the lower fan part 11B while attaining the maximum improvement in the air induction capacity of the fan during the recirculation mode of the air-conditioner operation. It has been found that, when the ratio of the axial dimension of the fan part 11A relative to the axial dimension of the fan part 11B is 60:25, the general air-blowing capacity of the centrifugal fan of the described embodiment is maximum.

However, if a mre increased rate of air flow is desired during the fresh air induction mode of air-conditioner operation, an alternative arrangement may be employed to assure that the damper 7 for the second recirculated-air inlet 4 is actuated independently of the operation of the fresh-air/recirculated-air changeover dampers 5 and 6. Further alternatively, the partition 11C in the centrifugal fan 11 may be formed therein with holes or openings to avoid any undue decrease in the air-blowing capacity of the fan during the fresh air induction mode of the air-conditioner.

The first-mentioned alternative arrangement may be formed either by a pure mechanical link mechanism or by vacuum-operated actuators respectively associated with the dampers 5,6 and 7 and solenoid valves respectively associated with the actuators to change over the application of vacuum and atmospheric pressure to diaphragms of the actuators. The solenoid valves may conveniently be remote-controlled by a conventional control circuit, not shown. To electronically control solenoid valves was well known in the art and, thus, will not be described in detail herein.

In the described embodiment of the invention, the fan casing 10A is formed by three separately molded parts, namely, the upper air induction casing 10B, the lower fan casing part and the lower air induction casing 10C. However, the fan casing 10A may alternatively be formed by two separately molded parts. The positions and dimensions of the air inlets and the dimensions and the number of the dampers may be appropriately changed within the spirit of the invention. For example, the second recirculated-air inlet 4 may be formed in the side wall of the lower air induction casing 10C rather than in the bottom wall thereof. The pivotal damper 7 for the second recirculated-air inlet 4 may be replaced by a slidable gate formed by a slidable plate or by a pair of telescopically arranged tubes which are formed therein with communication holes. Further alternatively, the second recirculated-air inlet 4 may be formed by a plurality of openings in the lower air induction casing 10C to increase the sectional area of the second recirculated-air inlet 4.

What is claimed is:

1. An automotive air-conditioner having a fan section and an air-conditioning section connected to a discharge side of said fan section to receive air therefrom and condition the thus received air, said air-conditioning section having at least one outlet through which the thus conditioned air flows into an occupant compartment, said fan section comprising:

a centrifugal fan having a plurality of circumferentially arranged vanes and axially opposite open ends through which flow of air enter the fan;

a fan casing accomodating said centrifugal fan;

said fan casing having a first wall portion including a first suction port closely adjacent to one of the open ends of said fan, a second wall portion including a second suction port closely adjacent to the other open end of said fan, a first air induction portion connected to said first wall portion and defining a fresh-air inlet and a first recirculated-air inlet both adapted to be communicated with said one open end of said fan, and a second air induction portion connected to said second wall portion and defining a second recirculated-air inlet adapted to be communicated with the other open end of said fans;

a first valve means for selectively opening and closing said fresh-air inlet and said first recirculated-air inlet;

a second valve means for opening and closing said second recirculated-air inlet; and actuating means operatively associated with said first and second valve means to actuate them so that said fresh-air inlet and said first and second recirculated-air inlets are operated and closed by said valve means, said actuating means comprising a servomotor and a mechanical link mechanism drivingly connected said servomotor to said first and second valve means, said first and second valve means and said link mechanism being arranged such that, when said fresh-air inlet is opened by said first valve means, said first recirculated-air inlet is closed by said first valve means and said second recirculated-air inlet is closed by said second valve means and such that, when said fresh-air inlet is closed by said first valve means, said first recirculated-air inlet is opened by said first valve means and said second recirculated-air inlet is opened by said second valve means.

2. An air-conditioner according to claim 1, wherein said centrifugal fan is generally cylindrical and includes a partition connected to said vanes and extending generally radially across the generally cylindrical fan to divide the same into first and second fan parts so that said fan parts are communicated with said axially opposite open ends of said fan, respectively.

3. An air-conditioner according to claim 2, wherein the vanes of said first fan part are circumferentially offset relative to the vanes of said second fan part.

4. An air-conditioner according to claim 2, wherein said first valve means comprises a first damper pivotally mounted on said fan casing between said freshair inlet and said first recirculated-air inlet and said second valve means comprises a second damper pivotally mounted on said fan casing adjacent to said second recirculated-air inlet.

5. An arr-conditioner according to claim 3, wherein said fan casing includes a main casing section and another casing section fabricated separately of said main casing section and detachably mounted thereon substantially coaxially with said fan, said second recirculated-air inlet being formed in the other casing section.

6. An air-conditioner according to claim 5, wherein said partition includes an integral central hub portion, and wherein said centrifugal fan further includes an electric motor having an output shaft secured to said hub portion for rotation therewith and thus with said vanes, said first and second fan sections being disposed in said main casing section, said main casing section being formed therein with an opening disposed inwardly of the other casing section, said motor having a body extending through said opening with an air passage defined between said motor body and an inner periphery of said opening, and means for detachably connecting said motor body to said main casing section substantially coaxially with said opening, said opening having a diameter greater than that of said fan to allow said fan to be removed from said main casing section when said motor body is disconnected from said main casing section.

7. An air-conditioner according to claim 6, wherein said detachably connecting means comprise an air guiding ring member detachably mounted on said main casing section adjacent to an inner peripheral edge of said opening, at least one radial stay member having a radially inner end secured to said motor body and means for resiliently connecting a radially outer end of s id stay to said ring member to prevent transmission of vibration from said motor body to said main casing section, whereby, when the other casing section is detached from said main casing section, said air guide ring, said stay, said motor, said partition and said first and second fan sections can be removed as a unit from said main casing section of said fan casing.

8. An air-conditioner according to claim 7, wherein said resiliently connecting means includes a screw member extending through a hole in the radially outer end of said stay and screwed into said ring member and a member of rubber interposed between said ring member and the radially outer end of said stay.

* * * * *